Alfred Boettcher
INVENTOR.

BY Karl F. Ross
Attorney

United States Patent Office 3,472,734
Patented Oct. 14, 1969

3,472,734
FUEL ELEMENT FOR LIQUID-COOLED NUCLEAR REACTORS
Alfred Boettcher, Aachen, Germany, assignor to Kernforschungsanlage Julich Nordrheim-Westfalen, Julich, Westphalia, Germany, a corporation of Germany
Continuation-in-part of application Ser. No. 498,786, Oct. 20, 1965. This application June 15, 1967, Ser. No. 646,268
The portion of the term of the patent subsequent to Nov. 26, 1985, has been disclaimed
Claims priority, application Germany, Oct. 22, 1964, K 54,321; Feb. 23, 1965, K 55,360
Int. Cl. G21c 3/20, 3/26
U.S. Cl. 176—71                    8 Claims

ABSTRACT OF THE DISCLOSURE

A fuel or fertile element for a water-cooled or liquid-metal-cooled nuclear-reactor core consisting of a hermetically sealed tubular can of a corrosion-resistant metal (e.g. Zircaloy) and a loosely packed mass of discrete ceramic-coated fuel particles whose cores consists of oxides, carbides or nitrides of uranium or thorium and whose coatings are composed of at least one of the refractory materials from the group of pyrolytic carbon or carbide, carbides of silicon, zirconium, beryllium or niobium, or oxides of beryllium, zirconium, magnesium and aluminum. The can is filled with helium gas at a pressure of 5 to 15 atm. (at ambient temperature) and is hermetically sealed so that the liquid coolant of the reactor in contact with the shell is, at the operating temperature of the core, at a pressure substantially equal to the pressure of the gas within the can. The coated-particle fuel may be mixed with a pulverulent ceramic filler of high thermal conductivity and from the group of carbon, carbides and oxides mentioned above.

This application is a continuation-in-part of my copending application Ser. No. 498,786, filed Oct. 20, 1965 (now abandoned), and also contains subject matter appearing in my copending application Ser. No. 561,126, filed June 28, 1966, and the commonly assigned copending application Ser. No. 554,339, filed June 1, 1966.

My present invention relates to an improved fuel element for nuclear reactors and, more particularly, to a fuel element especially for use in water- or metal-cooled fission reactors.

It is common practice to provide an assembly of individual elongated fuel elements in a predetermined array for generating a neutron flux and sustaining a nuclear reaction of the fission type. For the most part, these elements, which are generally tubular and contain a fissionable fuel, can be used in gas-cooled reactors as well as in liquid cooled devices in which the cooling medium comes into contact with the outer wall of the fuel element. The present invention is directed especially to improvements in fuel elements for liquid-cooled reactors and particularly reactors cooled by water, liquid sodium, mercury compounds or other metals. It has been proposed heretofore to provide fuel elements having thin-walled tubular shells of cylindrical configuration, of flat shape or of corrugated configuration which contain, as a fissionable fuel, uranium carbide, uranium oxide or other fissionable elements in combination therewith. The shell is usually composed of noncorrodible materials such as stainless steel or zirconium alloys (e.g. Zircaloy). The casing or shell thus serves not only to retain the fuel material but also to provide a heat-conductive barrier between the fuel and the cooling medium as described above. Such fuel elements have, however, the disadvantage that their assembly is relatively complicated and, consequently, expensive; moreover, it is observed that, in conventional fuel elements of the character described, there is an undesirable migration of the fuel substance against the direction of the temperature gradient to which the fuel element is subjected.

Moreover, conventional fuel elements of this general type have a proportionally low "Fifa-value," i.e. fission density in terms of the number of fission reactions per unit quantity of initially provided atoms of fissionable material.

It is the principal object of this invention to provide a fuel element in which the disadvantages discussed above can be avoided, which can be assembled in a relatively simple manner and which afford ease in preparing the fuel while giving rise to the desired neutron-flux distribution.

A further object of this invention is to provide a fuel element for liquid-cooled reactors whose dimensional stability is greater than that of fuel elements provided heretofore.

A still further object of this invention is to provide an improved method of operating a nuclear reactor to prevent deterioration of fuel elements of the character described by, for example, corrosive deterioration of the fuel-element shell especially in water-cooled or boiling-water reactors.

These objects and others which will become apparent hereinafter are attained, in accordance with the present invention, by the provision of a fuel element which comprises a metallic shell of a noncorrodible or corrosive-resistant material, such as Zircaloy, which contains particles of fissionable fuel encased in a so-called ceramic coating which can include carbon, beryllium oxide or carbide (i.e. pyrolytically precipitated carbon or graphite and/or silicon carbide, zirconium carbide, beryllium carbide, aluminum oxide, beryllium oxide, zirconium oxide, magnesium oxide, and niobium carbide as described in the aforementioned copending applications and in Journal of Nuclear Materials, vol. 11, pp. 1–31, 1964) and having a particle size of the order of several hundreds of microns. The shell is, according to the present invention, hermetically sealed upon evacuation of oxygen and, according to an important feature of this invention, upon introduction of inert gas such as helium at a super-atmospheric pressure at ambient temperature so selected that the pressure within the fuel element approximates the ambient pressure when the fuel element is in place in the operating reaction. It has been found that this pressure relationship, as will become apparent hereinafter, affords significant advantage in, for example, increasing the fuel-element life. It is believed that this increase in the life of the fuel element is a result of a decrease in the deterioration of the fuel-element shell. In conventional sealed fuel elements, an ambient pressure under room temperature is maintained in the interior of the shell so that, when the fuel element is placed in use in the reactor, the pressure differential applied across the wall of the shell gives rise to minute cracks in the surface of the shell which lead to a penetration of this surface by the cooling fluid and a corrosion of the shell material even if the latter is normally considered noncorrodible. It has been observed that the prestressing of the shell as discussed above avoids the formation of such cracks (as noted from microscope examination of the shell surfaces) and results in a decreased penetration of the shell wall by corrosive materials.

It has been proposed to encapsulate the fissionable particles, as the fuel element for the reactor, in carbonaceous materials. The encapsulated particles can, consequently, be produced by sintering or smelting uranium carbide or a mixture of uranium and thorium carbide to produce a fissionable core which is then covered with a layer of pyrolytically precipitated carbon. After the carbon deposit has been formed about the core, the particles are placed in a series of balls of porous graphite which are closed by threaded plugs. The assembly is cokefied at a temperature between substantially 1000° and 1700° C. to produce the encapsulated product. Such particles have been used heretofore substantially exclusively in gas-cooled high-temperature reactors.

The encapsulating of the fuel particles with carbon is found to be significant in holding back or containing the fission products formed upon disintegration of the fuel. Such fission products readily pass through the porous-graphite balls and can contaminate the reactor if the encapsulating step was not used.

I have now discovered that such encapsulated fuel particles can be used effectively in water- or metal-cooled reactors when they are incorporated in a thin-walled metal shell of a corrosion-resistant material such as zirconium alloy (e.g. Zircaloy) or stainless steel and the tubular shell is then hermetically sealed after evacuation of the shell to remove air present during the filling operation. Zircaloy metal is a common zirconium alloy (see for example Naval Reactor Physics Handbook, U.S. Atomic Energy Commission 1964, and Metallurgy of Zirconium, McGraw-Hill Book Company, 1955). It is found that a fuel element of this type has an efficiency far in excess of conventional fuel rods using the identical fuel and operates flawlessly over the lifetime of the fuel. It is especially to be noted that, when the metal shell has a thickness of not greater than 0.6 mm., the assembly is characterized by significantly improved conversions with a very high ratio of fission reactions to items of fuel. While substantially any fissionable material has been found suitable for use as the encapsulated fuel, it is observed that the carbides, oxides and nitrides of the most common fissionable materials (e.g. uranium and thorium) give the best results. Furthermore, the homogeneity of the reaction sustained by the fuel element is improved and the fission yield augmented when the mass of particles within the shell is an admixture of the encapsulated fuel particles with pulverulent granular or pelletized filler particles of good thermal conductivity. The filler can, most advantageously, be one of the ceramic coating materials, e.g. carbon, beryllium oxide and the like.

In accordance with another feature of this invention, the tubular shell is of generally cylindrical configuration and is coaxial with an inner tube so as to define with the latter a hollow cylindrical chamber in which the mass of the fuel and filler particles is received. The term "loosely packed" as used above to describe the state of the mass of particles is intended to denote a density of the order of that obtained by a simple piling of the particles in the absence of any packing pressure whatsoever. Thus, a "loosely packed" mass of particles will be formed when the discrete particles are simply poured into the shell. In the coaxial-tube arrangement, the cooling medium of the reactor contacts both the inner surface of the central tube and the outer surface of the shell.

According to a more specific feature of this invention, the mass of particles within the annular compartment is an inhomogeneous distribution of the fuel particles whereby the inner and outer walls of the element are maintained at different temperatures. The cooling liquid can thus be raised in temperature in two stages when the liquid is passed first into contact with the cooler surface and subsequently into contact with the warmer fuel-rod surface. This advantageous arrangement permits the fuel element to be used effectively in water-moderated superheated reactors.

Another not inconsiderable advantage of the present invention resides in the fact that the fuel element permits the maintaining of the most desirable neutron-flux density for a particular reactor. In this case, the distribution of the fuel particles and the filler of the mixture can be selected and the mixture composition established in accordance with the desired variation in neutron-flux density. In this fashion, it has been found to be easy both to convert the cosine characteristic of the neutron-flux density over the length of the rod, which is common in prior rod-like fuel elements, into a substantially linear neutron-flux density. This arrangement can be carried out with the aid of conventional mixing and filling devices without more complex equipment. The formation of a non-homogeneous distribution across the cross-section of the compartment can be attained by the temporary insertion of thin partitions between successively introduced layers or by sliding the particles into place with the aid of guides and the like without permitting mixing of the successively introduced cylindrical layers.

According to the aspect of the invention outlined above, the fuel element is filled with an inert gas, preferably helium, at an elevated pressure at ambient (room) temperature and preferably between 5 and 15 atmospheres at 20° C. but so selected that the pressure within the fuel element at the temperature of operation of the water- or metal-cooled reactor will approximate the external pressure applied thereto in the ractor. It has been observed that this pressure balance under operation conditions in the reactor is of considerable advantage since the pressure differentials hitherto applied across the shell of a fuel element by virtue of different pressures within and without gave rise to minute cracks, fissures or defects in which corrosion was initiated with early deterioration of the fuel elements in spite of the fact that corrosion-resisting materials are employed. It was also observed that the pressure differentials had a deleterious effect upon the fuel particles within the fuel element. While helium has been found most advantageous for the purpose indicated, it will be understood that other inert gases capable of maintaining the indicated elevated pressures can be employed. Although helium has been suggested as a blanketing material for fuel elements in other applications, it will be understood that the helium was generally introduced at ambient (approximately atmospheric) pressure.

According to another feature of the invention, a gas vessel containing the inert gas at an elevated pressure (at least several atmospheres) is connected to the fuel rod after evacuation and the fuel element sealed by welding thereto (e.g. preferably by electric-arc welding) caps disposed at the opposite ends of the fuel elements. If the sealing operation is carried out at an elevated pressure under a blanket of helium, the desired filling of the previously evacuated fuel element results.

The above and other objects, features and advantages of the present invention will become more readily apparent from the following description, reference being made to the accompanying drawing in which.

Figure 1:
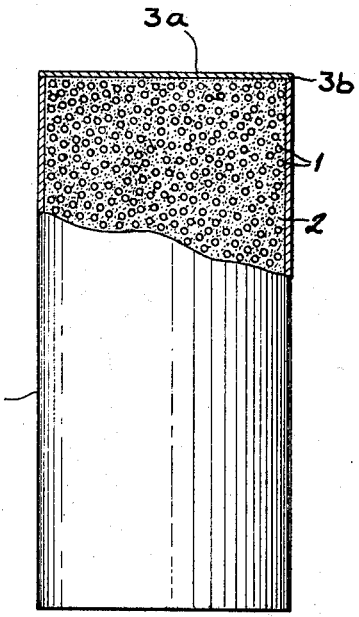
FIG. 1 is a vertical-elevational view of a fuel element according to the invention, partly broken away to show the fuel particles.
Figure 1A:
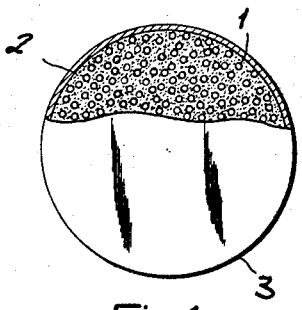
FIG. 1a is an end view of this element with part of the cap removed.

In FIGS. 1 and 1a, I show a generally cylindrical shell 3 composed of a corrosion-resistant stainless steel or zirconium alloy of the type described in the aforementioned publications and of a maximum thickness of about 0.6 mm. The shell 3 is hermetically sealed by end caps, one of which is shown at 3a welded at 3b to the shell, enclosing a pulverulent filler of carbon or beryllium oxide characterized by high thermal conductivity. The filler 2, which may have a particle size ranging between about 100 to 500μ and preferably consists of an oxide, carbide or nitride of uranium or thorium in an enriched state, is admixed with fuel particles consisting of or containing a nuclear breeding material such as $U^{238}$ or $Th^{232}$ which produce $Pu^{239}$ and $U^{233}$, respectively.

The particles have shells of pyrolytically deposited carbon of silicon, niobium, beryllium or zirconium carbides and/or of beryllium, aluminum, magnesium or zirconium oxides.

Figure 2:
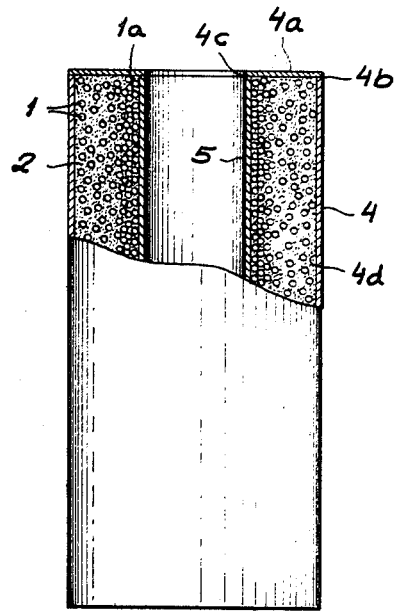
FIG. 2 is a view similar to FIG. 1 of another fuel-rod structure.
Figure 2A:
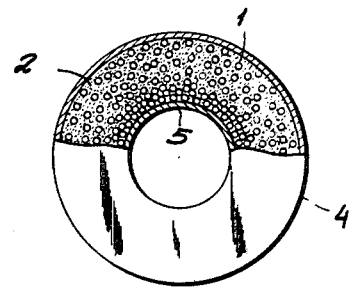
FIG. 2a is an end view, partly broken away, of this latter system.

In FIGS. 1 and 1a it can be seen that the distribution of the particles is substantially homogeneous across the cross-section of the fuel rod. In the system of FIGS. 2 and 2a, however, the tubular element has an outer shell 4 and an inner shell 5 disposed coaxially and secured together by caps 4a etc. which are arc-welded at 4b and 4c to the inner and outer walls. The particles 1 are more densely disposed at 1a proximal to the inner wall 5 so that the latter is relatively warmer than the outer wall. An inhomogeneous distribution along the length of the rod is also used for the purposes indicated earlier. In both cases, the fuel assembly is filled with helium at a pressure of 5 to 15 atmospheres at 20° C. A flat configuration of the fuel element can also be employed where this configuration is consistent with the points previously raised although the cylindrical form is preferred. The nonequal temperatures of the inner and outer walls can be achieved also by coating the outer wall 4 along its inner surface 4d with a thermally insulating layer. The filling of the assembly is preferably carried out by vibrating the assembly to settle the particles and it is also possible, if a slightly greater particle density is desired, to use the caps to press the particles into the shell or to deform the shell after welding to apply a mechanical pressure to the mass. In either case the pressure must be less than that at which the particle coatings are disrupted. In use it is found that the fuel elements are especially efficient and totally prevent a migration of fission fragments against the temperature gradient.

The invention described and illustrated is believed to admit of many modifications within the ability of persons skilled in the art, all such modifications being considered within the spirit and scope of the appended claims.

I claim:
1. A fuel element for a nuclear reactor comprising an air-expunged hermetically sealed tubular shell of a corrosion-resistant metal; and a loosely packed mass of discrete fuel particles within said shell by a piling of the particles in the absence of packing pressure, said particles each having a core of a fissionable substance encased in a layer of a material selected from the group which consists of pyrolytic carbon, graphite, silicon carbide, zirconium carbide, beryllium carbide, niobium carbide, beryllium oxide, zirconium oxide, magnesium oxide, and aluminum oxide.

2. A fuel element as defined in claim 1, further comprising an inert gas in said shell between the interstices of said particles and at a superatmospheric pressure at ambient temperature whereby the pressure within said shell at the operating temperature of said reactor is approximately equal to the pressure applied to said shell by the reactor.

3. A fuel element as defined in claim 2 wherein the gas is helium and is at a pressure ranging between 5 and 15 atmospheres in said shell at a temperature of about 20° C.

4. A fuel element as defined in claim 1 wherein said particles in said shell are admixed with a pulverulent ceramic filler of high thermal conductivity.

5. A fuel element as defined in claim 4 wherein said filler is selected from the group which consists of pyrolytic carbon, graphite, silicon carbide, zirconium carbide, beryllium carbide, niobium carbide, beryllium oxide, zirconium oxide, magnesium oxide, and aluminum oxide, and said core is selected from the group consisting of the oxides, carbides and nitrides of uranium and thorium.

6. A fuel element as defined in claim 5 wherein said cores include at least one fertile element from the group of uranium and thorium producing a fissionable substance.

7. A fuel element as defined in claim 1 wherein said shell is generally cylindrical and is provided coaxially with an inner tube of said metal defining with said shell an annular cylindrical compartment for said mass, said shell and said tube being adapted to contact the cooling medium of the reactor.

8. In a water- or metal-cooled nuclear reactor having a matrix of fuel elements and a cooling liquid for cooling said elements by direct contact therewith, the improvement wherein said fuel elements each comprise an air-expunged hermetically sealed tubular shell of a corrosion-resistant metal selected from the group which consists of zirconium alloys and stainless steels; and a loosely packed mass of discrete fuel particles within said shell, said particles having cores of a fissionable substance selected from the group consisting of the oxides, carbides and nitrides of uranium and thorium encased in respective layers of a substance selected from the group which consists of pyrolytic carbon, graphite, silicon carbide, zirconium carbide, beryllium carbide, niobium carbide, beryllium oxide, zirconium oxide, magnesium oxide, and aluminum oxide, said cooling medium in said reactor being at an elevated pressure, said shells each containing helium at a superatmospheric pressure at ambient temperature and at a pressure at the operating temperature of the reactor such that it approximates the pressure of the cooling liquid.

References Cited
UNITED STATES PATENTS

| | | | |
|---|---|---|---|
| 2,820,751 | 1/1958 | Saller | 176—67 X |
| 3,122,595 | 2/1964 | Oxley | 176—91 X |
| 3,158,547 | 11/1964 | Smith | 176—69 |
| 3,262,859 | 7/1966 | Winsche | 176—73 |
| 3,276,968 | 10/1966 | Ingleby | 176—91 X |
| 3,290,223 | 12/1966 | Blocher et al. | 176—91 X |
| 3,312,597 | 4/1967 | Glueckauf | 176—69 X |
| 3,325,363 | 6/1967 | Goeddel et al. | 176—91 X |
| 3,318,779 | 5/1967 | Turner et al. | 176—73 X |

FOREIGN PATENTS

| | | |
|---|---|---|
| 891,179 | 3/1962 | Great Britain. |
| 933,500 | 8/1963 | Great Britain. |

CARL D. QUARFORTH, Primary Examiner

M. J. SCOLNICK, Assistant Examiner

U.S. Cl. X.R.

176—67, 91